United States Patent
Bidmead et al.

(10) Patent No.: US 12,466,580 B2
(45) Date of Patent: Nov. 11, 2025

(54) AIRCRAFT SYSTEM

(71) Applicant: AIRBUS OPERATIONS LIMITED, Bristol (GB)

(72) Inventors: Ashley Bidmead, Bristol (GB); Florian Andre Joseph Becher, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 326 days.

(21) Appl. No.: 17/770,170

(22) PCT Filed: Oct. 12, 2020

(86) PCT No.: PCT/EP2020/078530
§ 371 (c)(1),
(2) Date: Apr. 19, 2022

(87) PCT Pub. No.: WO2021/078546
PCT Pub. Date: Apr. 29, 2021

(65) Prior Publication Data
US 2022/0411097 A1 Dec. 29, 2022

(30) Foreign Application Priority Data
Oct. 21, 2019 (GB) .................................. 1915220

(51) Int. Cl.
*B64D 45/00* (2006.01)
*B60T 8/17* (2006.01)
*B60T 17/22* (2006.01)
*B64C 25/42* (2006.01)

(52) U.S. Cl.
CPC ........ *B64D 45/0005* (2013.01); *B60T 8/1703* (2013.01); *B60T 17/221* (2013.01); *B64C 25/42* (2013.01)

(58) Field of Classification Search
None
See application file for complete search history.

(56) References Cited

U.S. PATENT DOCUMENTS

| | | | |
|---|---|---|---|
| 10,202,204 B1 * | 2/2019 | Daidzic | G08G 5/22 |
| 2010/0017052 A1 * | 1/2010 | Luce | B64C 25/60 |
| | | | 356/73.1 |
| 2010/0079308 A1 * | 4/2010 | Fabre | G08G 5/76 |
| | | | 340/951 |

(Continued)

OTHER PUBLICATIONS

International Search Report for PCT/EP2020/078530, mailed Feb. 10, 2021, 3 pages.

(Continued)

*Primary Examiner* — Abdhesh K Jha
*Assistant Examiner* — Melanie G Huber
(74) *Attorney, Agent, or Firm* — Nixon & Vanderhye P.C.

(57) ABSTRACT

An aircraft system for an aircraft is disclosed having a controller that is configured to receive at least one signal during a landing procedure of the aircraft and to determine that the aircraft is at a predetermined stage in the landing procedure, on the basis of the at least one signal. The predetermined stage in the landing procedure is before a command to extend at least one landing gear of the aircraft is issued during the landing procedure. The controller is configured to cause initiation of at least a part of a procedure to interrogate an aircraft braking system, on the basis of the determination.

20 Claims, 2 Drawing Sheets

(56) References Cited

U.S. PATENT DOCUMENTS

| | | | |
|---|---|---|---|
| 2010/0292889 A1 | 11/2010 | Cahill et al. | |
| 2012/0053783 A1* | 3/2012 | Nance | B64F 5/60 |
| | | | 701/33.1 |
| 2013/0105624 A1* | 5/2013 | Dubois | B64C 25/28 |
| | | | 244/102 R |
| 2013/0145833 A1* | 6/2013 | Cahill | B60T 17/221 |
| | | | 73/121 |
| 2014/0257603 A1* | 9/2014 | McKeown | G08G 5/0021 |
| | | | 701/16 |
| 2015/0127195 A1* | 5/2015 | Cahill | B64C 25/44 |
| | | | 701/3 |
| 2016/0052502 A1 | 2/2016 | Cahill et al. | |
| 2020/0189552 A1* | 6/2020 | Georgin | B60T 17/22 |

OTHER PUBLICATIONS

Written Opinion of the ISA for PCT/EP2020/078530, mailed Feb. 10, 2021, 6 pages.

* cited by examiner

AIRCRAFT SYSTEM

CROSS REFERENCE TO RELATED APPLICATIONS

The present application is a National Phase of International Application Number PCT/EP2020/078530 filed Oct. 12, 2020, which designated the U.S. and claims priority benefits from Great Britain Patent Application Number GB1915220.6, filed Oct. 21, 2019, the entire contents of each of which are hereby incorporated by reference.

TECHNICAL FIELD

The present invention relates to aircraft systems for aircraft, and to methods of operating controllers of aircraft systems of aircraft during landing procedures.

BACKGROUND

Aircraft and aircraft systems are typically required to perform a Pre-Landing Test ("PLT") during landing procedures. A PLT is performed at least in part to check the functionality and integrity of a braking system for landing gear of the aircraft. The PLT may interrogate the braking system by commanding the operation of, for example, valves, pumps and actuators, and detecting a response of the system to the operation. This test determines which, if any, braking modes may have been lost or compromised, prior to touchdown of the aircraft on a runway.

Conventionally, completion of the PLT requires the landing gear to be extended. Therefore, the PLT is initiated on the basis of a landing gear control lever position in a cockpit of the aircraft. Furthermore, a time to complete the PLT may be substantial, particularly if errors are detected during the test. If a command to extend the landing gear is issued late in the landing procedure, and/or if a period for completing the test is so long that the test would be incomplete by the time the aircraft touches down, then the PLT may not be fully complete before landing. In such instances, the brakes of the braking system may be engaged at touchdown, leading to undesirable wear of tyres of the aircraft landing gear.

SUMMARY

A first aspect of the present invention provides an aircraft system for an aircraft, the aircraft system comprising a controller that is configured to: receive at least one signal during a landing procedure of an aircraft; determine that the aircraft is at a predetermined stage in the landing procedure, on the basis of the at least one signal, wherein the predetermined stage is before a command to extend at least one landing gear of the aircraft is issued during the landing procedure; and cause initiation of at least a part of a procedure to interrogate an aircraft braking system, on the basis of the determination.

Optionally, the controller is configured to conclude that the aircraft is at the predetermined stage in the landing procedure when: an elapsed time since the beginning of a descent during the landing procedure meets a predefined time; a projected time to a touchdown event in the landing procedure meets a predefined time; and/or a projected time to an extension of landing gear during the landing procedure meets a predefined time.

Optionally, the procedure to interrogate the aircraft braking system is a predetermined procedure.

Optionally, the controller is configured to determine the procedure to interrogate the aircraft braking system on the basis of the at least one signal.

Optionally, the controller is configured to cause initiation of a first part of the procedure to interrogate the aircraft braking system before receiving a command to extend the landing gear, and cause initiation of a second part of the procedure to interrogate the aircraft braking system after receiving a command to extend the landing gear.

Optionally, the at least one signal comprises information representative of at least one characteristic of the aircraft.

Optionally, the aircraft system comprises a sensor system that is configured to sense the at least one characteristic of the aircraft and to send the at least one signal comprising information representative of the at least one characteristic to the controller.

Optionally, the aircraft system comprises a receiver that is configured to receive the at least one signal from a location remote from the aircraft and to send the at least one signal to the controller.

Optionally, the aircraft system comprises a warning device configured to issue a warning, when the determining results in a conclusion that the aircraft is at the predetermined stage in the landing procedure.

Optionally, the controller is configured to receive an approval signal indicative of an approval to cause the initiation of the at least a part of the interrogation procedure, and to cause initiation on the basis of the approval signal.

Optionally, the approval signal is received from a cockpit flight control that is operable by a member of a flight crew of the aircraft.

Optionally, the characteristic of the aircraft is any one or a combination of: aircraft position; aircraft motion; aircraft orientation; and aircraft configuration.

Optionally, the controller being configured to cause initiation of the brake interrogation procedure comprises the controller being configured to instruct the operation of one or more components of the aircraft braking system and to detect a response of the aircraft braking system to the operation of the one or more components.

Optionally, the one or more components comprise at least one hydraulic component.

Optionally, the controller is configured to carry out the at least a part of the procedure.

A second aspect of the present invention provides a method of operating a controller of an aircraft system of an aircraft, the method comprising: receiving at least one signal during a landing procedure of the aircraft; determining that the aircraft is at a predetermined stage in the landing procedure, on the basis of the at least one signal, wherein the predetermined stage is before a command to extend at least one landing gear of the aircraft is issued during the landing procedure; and causing initiation of at least a part of a procedure to interrogate an aircraft braking system of the aircraft, on the basis of the determination.

Optionally, the method comprises interrogating the aircraft braking system according to the at least a part of the procedure, wherein the interrogating the aircraft braking system comprises operating one or more components of the aircraft braking system and detecting a response of the aircraft braking system to the operation of the one or more components.

Optionally, the one or more components comprise at least one hydraulic component.

Optionally, the determining results in a conclusion that the aircraft is at the predetermined stage in the landing procedure when: an elapsed time since the beginning of a descent during the landing procedure meets a predefined time; a projected time to a touchdown event in the landing procedure meets a predefined time; and/or a projected time to an extension of landing gear during the landing procedure meets a predefined time.

Optionally, the procedure to interrogate the aircraft braking system is a predetermined procedure.

Optionally, the method comprises determining the procedure to interrogate the aircraft braking system on the basis of the at least one signal.

Optionally, the method comprises causing initiation of a first part of the procedure to interrogate the aircraft braking system before receiving a command to extend the landing gear, and causing initiation of a second part of the procedure to interrogate the aircraft braking system after receiving a command to extend the landing gear.

Optionally, the at least one signal comprises information representative of at least one characteristic of the aircraft.

Optionally, the method comprises sensing the at least one characteristic of the aircraft.

Optionally, the method comprises receiving the at least one signal from a location remote from the aircraft.

Optionally, the method comprises causing a warning device to issue a warning, when the determining that the aircraft is at the predetermined stage in the landing procedure results in a conclusion that the aircraft is at the predetermined stage in the landing procedure.

Optionally, the method comprises receiving an approval signal indicative of an approval to cause the initiation of the at least a part of the interrogation procedure and causing initiation on the basis of the approval signal.

Optionally, the approval signal is received from a cockpit flight control that is operable by a member of a flight crew of the aircraft.

Optionally, the characteristic of the aircraft is any one or a combination of: aircraft position; aircraft motion; aircraft orientation; and aircraft configuration.

A third aspect of the present invention provides a non-transitory computer-readable storage medium storing instructions that, if executed by a controller of an aircraft system of an aircraft, cause the controller to carry out the method according to the second aspect of the present invention.

A fourth aspect of the present invention provides an aircraft system for an aircraft, the aircraft system comprising: a sensor system that is configured to sense at least one characteristic of the aircraft during a landing procedure of the aircraft, and to output information representative of the at least one characteristic; a braking system that is configured to brake one or more wheels of the aircraft; and a control system that is configured to: receive the information from the sensor system; determine that the aircraft is at a predetermined stage in the landing procedure, on the basis of the information, wherein the predetermined stage is before a command to extend at least one landing gear of the aircraft is issued during the landing procedure; and cause initiation of at least a part of a procedure to interrogate the braking system, on the basis of the determination.

Optionally, the control system is configured to conclude that the aircraft is at the predetermined stage in the landing procedure when: an elapsed time since the beginning of a descent during the landing procedure meets a predefined time; a projected time to a touchdown event in the landing procedure meets a predefined time; and/or a projected time to an extension of landing gear during the landing procedure meets a predefined time.

Optionally, the procedure to interrogate the braking system is a predetermined procedure.

Optionally, the control system is configured to determine the procedure to interrogate the braking system is on the basis of the at least one signal.

Optionally, the control system is configured to cause initiation of a first part of the procedure to interrogate the braking system before receiving a command to extend the landing gear, and cause initiation of a second part of the procedure to interrogate the braking system after receiving a command to extend the landing gear.

Optionally, the at least one signal comprises information representative of at least one characteristic of the aircraft.

Optionally, the sensor system is configured to send the at least one signal comprising information representative of the at least one characteristic to the control system.

Optionally, the aircraft system comprises a receiver that is configured to receive the at least one signal from a location remote from the aircraft and to send the at least one signal to the control system.

Optionally, the aircraft system comprises a warning device configured to issue a warning, when the determining that the aircraft is at the predetermined stage in the landing procedure results in a conclusion that the aircraft is at the predetermined stage in the landing procedure.

Optionally, the control system is configured to receive an approval signal indicative of an approval to cause the initiation of the at least a part of the interrogation procedure, and to cause initiation on the basis of the approval signal.

Optionally, the aircraft system comprises a cockpit flight control that is operable by a member of a flight crew of the aircraft, and the approval signal is received from the cockpit flight control.

Optionally, the characteristic of the aircraft is any one or a combination of: aircraft position; aircraft motion; aircraft orientation; and aircraft configuration.

Optionally, the control system being configured to cause initiation of the brake interrogation procedure comprises the controller being configured to instruct the operation of one or more components of the braking system and to detect a response of the braking system to the operation of the one or more components.

Optionally, the one or more components of the braking system comprise at least one hydraulic component.

Optionally, the control system is configured to carry out the at least a part of the procedure.

A fifth aspect of the present invention provides an aircraft system for an aircraft, the aircraft system comprising a controller that is configured to: receive at least one signal comprising information representative of an action to be taken during a landing procedure and before a command to extend at least one landing gear of the aircraft is issued during the landing procedure; and cause initiation of at least a part of a procedure to interrogate an aircraft braking system, on the basis of the received signal.

A sixth aspect of the present invention provides an aircraft comprising the aircraft system according to the first, fourth or fifth aspect of the present invention or comprising the non-transitory computer-readable storage medium according to the third aspect of the present invention.

BRIEF DESCRIPTION OF THE DRAWINGS

Embodiments of the invention will now be described, by way of example only, with reference to the accompanying drawings, in which.

DETAILED DESCRIPTION

In some known aircraft, landing gear is stowed in a retracted position in a landing gear bay during flight and is extended to an extended position before the aircraft lands. Such stowage of the landing gear helps to reduce aircraft drag and noise and the risk of the landing gear being damaged in flight. Movement of the landing gear is typically controlled by a pilot using cockpit flight controls of the aircraft, such as a landing gear control lever.

A pre-landing test (PLT) is conventionally initiated upon extension of the landing gear, or in response to a command to extend the landing gear. The PLT generally comprises interrogating a braking system of the aircraft by commanding the operation of braking system components and detecting a response, of the braking system or the braking system components, to the command. This may be to ensure that at least one mode of braking is operable or suitably functional before landing.

Figure 1:
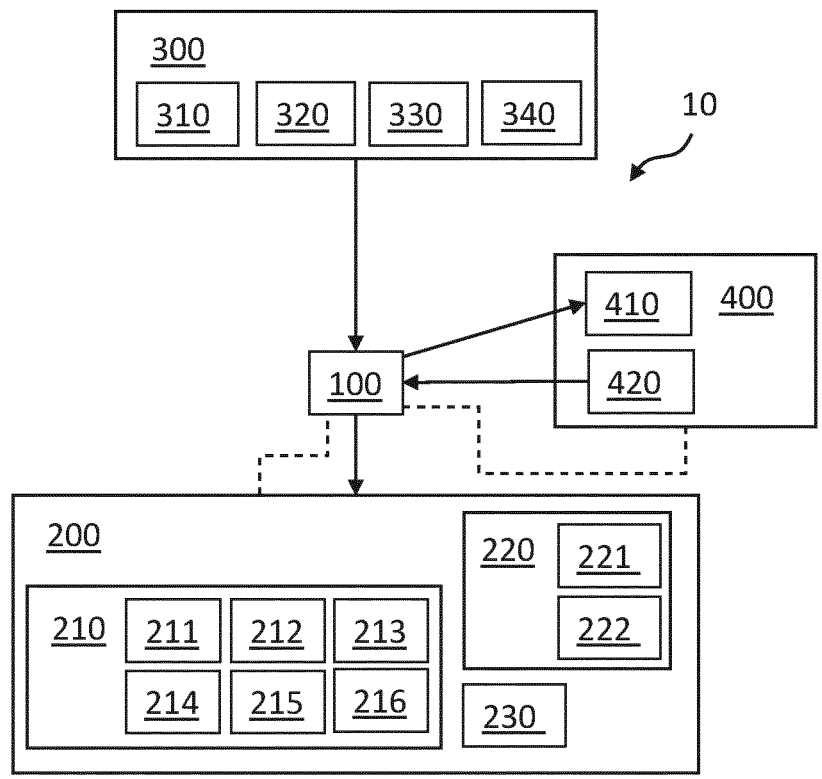
FIG. 1 shows a schematic view of an example of an aircraft system.

FIG. 1 shows a schematic view of an aircraft system 10 according to an example. Broadly speaking, the aircraft system 10 comprises a controller 100, a braking system 200 that is operatively and communicatively connected to the controller 100, a sensor system 300 that is communicatively connected to the controller 100, and a warning device 410 and a cockpit flight control 420 located in a cockpit 400 of the aircraft. Each of these elements will be briefly discussed in turn.

The controller 100 may take any suitable form. The controller 100 may comprise a processor, such as a microprocessor. Broadly speaking, the controller 100 is configured to receive at least one signal during a landing procedure of the aircraft and determine that that the aircraft is at a predetermined stage in the landing procedure, on the basis of the at least one signal, wherein the predetermined stage is before a command to extend at least one landing gear of the aircraft is issued during the landing procedure. The controller is further configured to cause initiation of at least a part of a procedure to interrogate an aircraft braking system, on the basis of the determination. In the present example, the procedure to interrogate the aircraft braking system (the 'interrogation procedure') is the PLT and may be referred to as such herein.

The braking system 200 is for braking wheels of at least one landing gear of the aircraft. The braking system 200 comprises a hydraulic system 210 comprising hydraulic fluid and at least one or a combination of: an accumulator 211; a valve 212; an actuator 213; a pump 214; a reservoir 215; and a filter 216. The hydraulic system 210 may comprise any other components typically found in an aircraft braking system. In some examples, components of the hydraulic system 210, such as valves or actuators, are operated electro-mechanically, and the hydraulic system 210 comprises associated circuitry for operating the components. The circuitry may comprise fuses and/or other circuit breakers for electrically isolating components of the hydraulic system 210, for example. In some other examples, the braking system 200 may alternatively, or in addition, comprise an appropriate electrical or electro-mechanical system for braking the wheels of the at least one landing gear. Power may be supplied to the braking system 200 from a power supply (not shown), such as an electric or hydraulic power supply.

The braking system further comprises sensors 220 for sensing one or more characteristics of the hydraulic system 210. The sensors 220 may comprise a temperature sensor 221 and/or a pressure sensor 222 for detecting a temperature and/or a pressure of the hydraulic fluid in the hydraulic system 210. In some examples, the hydraulic system 210 comprises a position sensor, such as a linear variable differential transformer (LDVT), for detecting a position of one of the components or a part thereof, such as a piston in the hydraulic accumulator 211. In some examples, the sensors 220 may comprise appropriate sensors for detecting the operation of one or more components of the hydraulic system 200, such as valves 212, actuators 213 and/or pumps 214.

The braking system 200 of the present example comprises a braking system controller 230 which is configured to cause operation of the components of the braking system 200, such as the hydraulic system 210 and the sensors 220. The braking system controller 230 may be configured to perform the interrogation procedure, for example. In other examples, the braking system controller 230 does not exist, and the braking system 200 is controlled by other means, such as by the controller 100.

The sensor system 300 in this example comprises plural different sensors 310 to 340. In other examples, any one or more of the sensors 310 to 340 may be omitted. Each of the sensors 310 to 340, and thus the sensor system 300 as a whole, is configured to sense at least one characteristic of the aircraft and to send the at least one signal mentioned above to the controller 100. The at least one signal comprises information representative of the at least one characteristic.

More specifically, in this example, the sensors 310 to 340 comprise:

at least one position sensor 310 that is configured to sense a position of the aircraft;

at least one motion sensor 320 that is configured to sense a motion of the aircraft;

at least one orientation sensor 330 that is configured to sense an orientation of the aircraft; and at least one configuration sensor 340 that is configured to sense a configuration of the aircraft.

The at least one position sensor 310 may be configured to sense a geographical location, altitude and/or a time of flight of the aircraft, for example. Therefore, the at least one position sensor 310 may comprise a pressure altimeter, a sonic altimeter, a radio altimeter, a RADAR altimeter, a satellite-based radio navigation system (such as the Global Positioning System, or "GPS"), a data logger, or the like.

The at least one motion sensor 320 may be configured to sense a speed, climb rate and/or descent rate of the aircraft, for example. Therefore, the motion sensor 320 may comprise a pitot tube, a satellite-based radio navigation system, a RADAR system, or the like.

The at least one orientation sensor 330 may be configured to sense a pitch, roll, yaw and/or heading of the aircraft. Therefore, the orientation sensor 330 may comprise an accelerometer, a gyroscope, a satellite-based radio navigation system, a RADAR system, an imaging system or the like.

The at least one configuration sensor 340 may be configured to sense a configuration, such as a status or a position, of a component of the aircraft. Therefore, the at least one configuration sensor 340 may comprise any sensor suitable for sensing a configuration of a flap, aileron, spoiler, landing gear, autopilot, or the like. Alternatively, or in addition, the at least one configuration sensor may be configured to detect a configuration signal issued by a cockpit flight control 420 located in the cockpit 400 of the aircraft, the configuration signal indicative of a desired or achieved configuration of a component of the aircraft.

Given the teaching of the present disclosure, the skilled person will be able to identify other relevant aircraft characteristic sensors, the outputs of which are suitable for use with the present disclosure. It will be understood that, in some examples, the at least one signal may be received by a receiver (not shown) of the aircraft system from a location remote from the aircraft, and the receiver may be configured to send the at least one signal to the controller 100. For example, the at least one signal may be received from an air traffic control system, a satellite system, another aircraft, or any other air-, space- or ground-based system. In this way, the aircraft may require fewer sensors and/or reduced processing power. Moreover, receiving the at least one signal from a ground-based system, for instance, near to an airport may provide an accurate determination of aircraft characteristics, such as a location of the aircraft, or a proximity of the aircraft to a runway. The ground-based system may be a nautical system.

The warning device 410 is a device that is configured to emit a warning to flight crew in the cockpit 400. The warning may be an audible warning such as a beep, ring or buzz, and/or a visual warning such as a flashing light or illuminated indicia, and/or a tactile warning such as a vibration. The purpose of the warning device 410 will be described below. In some other examples, the warning device 410 is omitted.

The cockpit flight control 420 is a control that is operable by a member of the flight crew to send a signal to the controller 100, or to any other controller of the aircraft, as will be described in more detail below. It may, for example, comprise a lever, a button, a different type of user-movable device, a touchpad, a touchscreen, a gesture-operable device, a voice-operable device, or any combination thereof. In some other examples, the cockpit flight control 420 is omitted.

The at least one signal sent by the sensor(s) 310 to 340 to the controller 100 thus comprises information representative of at least one of the sensed characteristics of the aircraft. As noted above, on the basis of the at least one signal received from the sensor system 300 during a landing procedure of the aircraft, the controller 100 is configured to then determine whether the aircraft is at the predetermined stage in the landing procedure. The predetermined stage in the landing procedure may be defined, for example, in terms of: an elapsed time since the beginning of a descent during the landing procedure; a projected time to a touchdown event in the landing procedure; and/or a projected time to an extension of the landing gear during the landing procedure.

It may be determined that the aircraft is at the predetermined stage in the landing procedure when it is determined that: the aircraft has left a cruise phase of a flight; the aircraft has reached a predetermined altitude during a descent; the aircraft is a predetermined distance from an airport; the aircraft is a predetermined estimated time away from touchdown; the aircraft is flying at a predetermined airspeed, seatbelt signs have been engaged; wing flaps have been extended, or the like. It will be understood that these options are provided by way of example only, and that the predetermined stage in the landing procedure may be any other stage in the landing procedure before a command to extend at least one landing gear of the aircraft is issued during the landing procedure.

The controller is configured to cause initiation of at least a part of the interrogation procedure on the basis of the determination that the aircraft is at the predetermined stage in the landing procedure. The interrogation procedure comprises operating one or more components of the braking system 200 and detecting a response of the braking system 200 to the operation using one or more sensors 220. By way of example only, the interrogation procedure may comprise interrogating a valve 212 and/or an actuator 213 which is a braking actuator. Interrogating the valve 212 and/or the actuator 213 may comprise operating the valve 212 to direct hydraulic fluid to the actuator 213, thereby to increase a pressure in the actuator 213 and impart a braking force to a wheel. A sensor 220, such as a linear potentiometer, may detect an extension or retraction, or lack thereof, of the actuator 213. If an expected response of the braking system 200 is not detected, such as if an extension or retraction of the actuator 213 is not detected, this may be indicative of a fault in at least a part of the braking system 200. If a fault is detected, the interrogation procedure may comprise further interrogating the components of the braking system 200 in order to identify the fault.

In some examples, a fault may be detected if a component of the hydraulic system 210 is inoperable or is operating incorrectly. In some examples, a fault may be detected if a fuse or other circuit breaker of the hydraulic system 210 has been tripped. In some examples, a fault may be detected if the integrity of one or more components of the hydraulic system 210 has been compromised, such as if the accumulator 211 is leaking, or if a hydraulic line has been ruptured, for example.

It will be understood that, in other examples, the interrogation procedure may comprise interrogating any other components of the braking system 200. For example, operating the one or more components of the braking system 200 may comprise any one or more of: activating a motor, activating a pump, pressurising an accumulator, actuating a valve, actuating a braking actuator, or the like. If a fault is determined during the interrogation procedure, a warning may be issued to the warning device 410. The warning may alert the flight crew to the fault or may indicate to the flight crew whether or which braking modes are operational. This may, for example, enable the flight crew to take remedial action in response to the fault.

In some examples, the interrogation procedure takes a relatively long time to complete, particularly if the interrogation procedure identifies any faults or anomalies. For example, the interrogation procedure may typically take around ninety seconds to complete. If a fault is detected during the interrogation procedure, the time to complete may increase to two minutes or more, as the interrogation procedure may further interrogate components of the braking system 200 to identify the fault. In comparative examples, this may result in the interrogation procedure being incomplete before the aircraft touches down on a runway. In some systems, the landing gear must be extended for one or more components of the braking system 200 to be interrogated. Therefore, in comparative examples, the interrogation procedure is typically initiated on or after a command to extend a landing gear of the aircraft is issued during the landing procedure. Such a command may be issued late in the landing procedure, and therefore there may be insufficient time to complete the interrogation procedure. The command may be issued the cockpit flight control 420 located in the cockpit 400 of the aircraft, for instance by moving a lever or pushing a button. The issuance of the command may be detected by the controller 100. In some examples, the issuance of the command may be detected by the configuration sensor 340 and reported to the controller 100.

In contrast to such comparative examples, the controller 100 causes initiation of at least a part of the interrogation procedure before a command to extend the landing gear is issued. Thereby, at least a part of the interrogation procedure can be completed before the command to extend the landing gear is issued. In some examples, the controller 100 may initiate a first part of the procedure before a command to extend the landing gear is given and optionally received by the controller 100, and a second part of the procedure after a command to extend the landing gear is given and optionally received by the controller 100. In this way, a time required to complete a remainder of the interrogation procedure after extension of the landing gear may be reduced. In any case, initiating at least a part of the interrogation procedure before a command to extend the landing gear is issued makes it more likely that the entire interrogation procedure will be completed before touchdown of the aircraft. Moreover, if a fault is detected during the interrogation procedure and a warning is issued to the warning device 410, the flight crew may have more time to take remedial action in response to the warning if at least a part of the interrogation procedure is initiated early.

In some examples, the controller 100 is configured to cause the warning device 410 to issue a warning, when the controller 100 determines that the aircraft is at the predetermined stage in the landing procedure. The warning can alert the flight crew to the initiation of the at least a part of the interrogation procedure. This may, for example, enable them to take some action in response to the initiation, or may serve as forewarning that the controller 100 is going to cause an interrogation of braking system 200 components to take place, or may serve as an explanation as to why interrogation of the braking system 200 has or is taking place. If only a part of the interrogation procedure has been initiated, the warning may indicate which part or parts of the interrogation procedure have been initiated. This may inform the flight crew which, if any, braking modes of the braking system 200 are going to be tested during the interrogation procedure. In other examples, no such warning(s) may be given.

In some examples, the warning may prompt flight crew to approve the initiation of the at least a part of the interrogation procedure. For example, the flight crew may use the cockpit flight control 420 to send an approval signal to the controller 100, the approval signal indicative of an approval to cause the initiation of the at least a part of the interrogation procedure. In this case, the controller may be configured to cause initiation of the interrogation procedure on receipt of the approval signal.

It is to be noted that, in this example, the controller 100 causing initiation of at least a part of the interrogation procedure involves the controller 100 suitably instructing or informing the braking system 200, or the braking system controller 230 thereof, to perform accordingly. In other examples, the controller 100 may itself suitably communicate with and command the components of the braking system 200. That is, the controller may be configured to instruct operation of one or more components of the braking system 200 and to receive signals from the sensors 220. In this way, the controller 100 may be configured to carry out the at least a part of the interrogation procedure.

Figure 2:
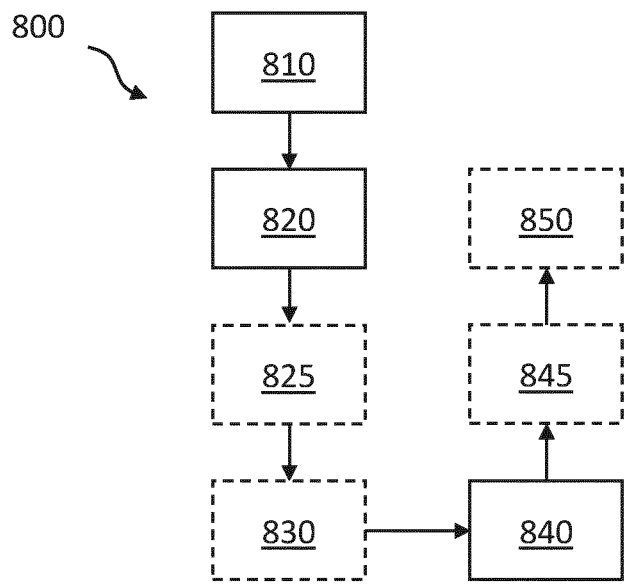
FIG. 2 is a flow diagram showing an example of a method of operating a controller of an aircraft system of an aircraft during a landing procedure.

FIG. 2 is a flow diagram showing an example of a method of operating a controller of an aircraft system of an aircraft during a landing procedure. The method 800 may be performed by the controller 100 discussed herein or any variant thereof discussed herein, for example. The method 800 comprises: receiving 810 at least one signal during the landing procedure; determining 820 that an aircraft is at a predetermined stage in the landing procedure, on the basis of the at least one signal, wherein the predetermined stage is before a command to extend at least one landing gear of the aircraft is issued during the landing procedure; and causing 840 initiation of at least a part of a procedure to interrogate an aircraft braking system of the aircraft on the basis of the determination.

In some examples, the at least one signal comprises information representative of at least one characteristic of the aircraft, such as an aircraft position, aircraft motion, aircraft orientation, and/or aircraft configuration, as discussed above in more detail with reference to FIG. 1. In some examples, the signal is received from sensors on the aircraft. In other examples, the signal is received from a location remote from the aircraft, such as air traffic control.

In some examples, the predetermined stage in the landing procedure may be defined, for example, in terms of: an elapsed time since the beginning of a descent during the landing procedure; a projected time to a touchdown event in the landing procedure; and/or a projected time to an extension of the landing gear during the landing procedure, as discussed above in more detail with reference to FIG. 1.

In some examples, the method comprises causing 825 a warning device to issue a warning, when the determining results in a conclusion that the aircraft is at a predetermined stage in the landing procedure. In some examples, the method comprises receiving 830 an approval signal indicative of an approval to cause the initiation of the at least a part of the interrogation procedure (such as from a cockpit flight control that is operable by a member of a flight crew); and the causing 840 initiation is on the basis of the approval signal.

In some examples, the causing 840 initiation of at least a part of the interrogation procedure comprises instructing an interrogation system to perform the at least a part of the interrogation procedure. In some examples, the method comprises interrogating 845 the aircraft braking system according to the at least a part of the procedure, wherein the interrogating the aircraft braking system comprises operating one or more components of the aircraft braking system and detecting a response of the aircraft braking system to the operation of the one or more components. In some examples, the method comprises causing 850 initiation of at least a part of the interrogation procedure after a command to extend the at least one landing gear of the aircraft is issued during the landing procedure.

In some examples, the interrogation procedure is a predetermined procedure. In other examples, the interrogation procedure is determined on the basis of the at least one signal. For example, the interrogation procedure may comprise interrogating only safety-critical components of the aircraft braking system, if the at least one signal is indicative of a predetermined proximity to touchdown.

Figure 3:
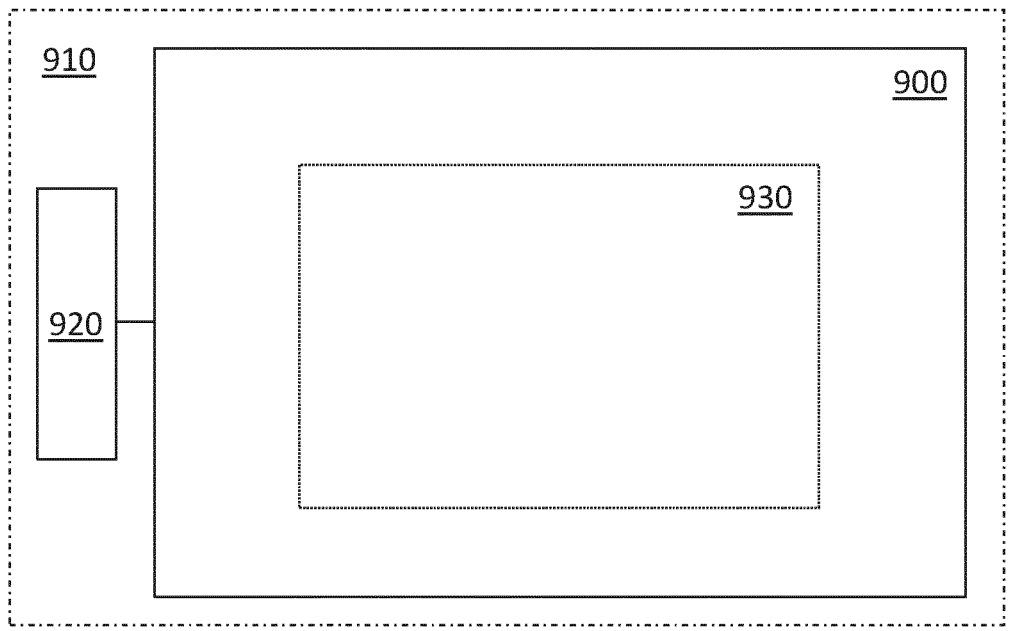
FIG. 3 is a schematic diagram of an example of a non-transitory computer-readable storage medium.

FIG. 3 shows a schematic diagram of a non-transitory computer-readable storage medium 900 according to an example. The non-transitory computer-readable storage medium 900 stores instructions 930 that, if executed by a processor 920 of a controller 910 of an aircraft, cause the processor 920 to perform one of the methods described herein. In some examples, the controller 910 is the controller 100 described above with reference to FIG. 1 or a variant thereof described herein. The instructions 930 comprise: receiving at least one signal during the landing procedure; determining that the aircraft is at a predetermined stage in the landing procedure, on the basis of the at least one signal, wherein the predetermined stage is before a command to extend at least one landing gear of the aircraft is issued during the landing procedure; and causing initiation of at least a part of a procedure to interrogate an aircraft braking system of the aircraft, on the basis of the determination. The instructions 930 may comprise instructions to perform any of the methods 800 described above with reference to FIG. 2.

Figure 4:
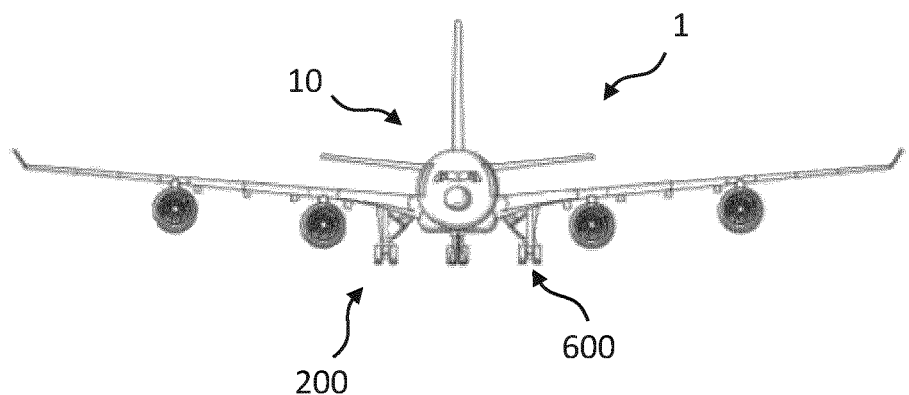
FIG. 4 is a schematic front view of an example of an aircraft.

FIG. 4 is a schematic front view of an aircraft 1. The aircraft 1 comprises an aircraft system 10 as discussed herein, such as the aircraft system 10 discussed herein with reference to FIG. 1 or any variant thereof discussed herein. The aircraft 1 also comprises a braking system 200 as discussed herein, such as the braking system 200 discussed herein with reference to FIG. 1 or any variant thereof discussed herein. The aircraft system 10 may be operatively connected to the braking system 200. The aircraft 1 also comprises the non-transitory computer-readable storage medium 900 discussed herein with reference to FIG. 3.

The aircraft 1 is shown comprising a landing gear 600. The braking system 200 is coupled to, or at least partially comprised in, the landing gear 600. The braking system is configured to brake one or more wheels of the landing gear 600. The landing gear 600 may comprise landing gear bay doors and landing gear actuators for moving the doors and extending/retracting the landing gear 600, along with a corresponding landing gear controller (not shown).

The landing gear controller is configured to cause actuation of the landing gear doors and landing gear actuators as required. For example, this may be in in response to commands received at the landing gear controller from cockpit flight controls that are located in the cockpit 400 and operable by flight crew, or in response to instructions received at the landing gear controller from the aircraft system controller 100.

It is to be noted that the term "or" as used herein is to be interpreted to mean "and/or", unless expressly stated otherwise.

The invention claimed is:

1. An aircraft system for an aircraft, the aircraft system comprising a controller that is configured to:
   receive at least one non-simulated signal during a real landing procedure of the aircraft;
   determine that the aircraft is at a predetermined stage in the real landing procedure prior to touchdown of the aircraft, on the basis of the at least one non-simulated signal, wherein the predetermined stage is before a command to extend at least one landing gear of the aircraft is issued during the real landing procedure;
   on the basis of the determination, and before the command to extend the at least one landing gear of the aircraft is issued, causing the aircraft system to initiate a first part of a procedure to interrogate an aircraft braking system, on the basis of the determination; and
   in response to the issued command to extend the at least one landing gear of the aircraft, cause the aircraft system to initiate a remaining part of the procedure to interrogate the aircraft braking system, the remaining part to be performed after completion of the first part, whereby initiating the first part of the procedure to interrogate the aircraft braking system before the command to extend the at least one landing gear is issued causes the remaining part of the procedure to interrogate the aircraft braking system to be initiated after the command to extend the at least one landing gear is issued and thus to be completed before touchdown of the aircraft.

2. The aircraft system according to claim 1, wherein the at least one signal comprises information representative of at least one characteristic of the aircraft.

3. The aircraft system according to claim 2, comprising a sensor system that is configured to sense the at least one characteristic of the aircraft and to send the at least one signal comprising information representative of the at least one characteristic to the controller.

4. The aircraft system according to claim 2, comprising a receiver that is configured to receive the at least one signal from a location remote from the aircraft and to send the at least one signal to the controller.

5. The aircraft system according to claim 4, wherein the characteristic of the aircraft is any one or a combination of: aircraft position; aircraft motion; aircraft orientation; and aircraft configuration.

6. The aircraft system according to claim 1, wherein the controller being configured to cause initiation of the procedure to interrogate the aircraft braking system comprises the controller being configured to instruct the operation of one or more components of the aircraft braking system and to detect a response of the aircraft braking system to the operation of the one or more components.

7. The aircraft system according to claim 6, wherein the one or more components comprise at least one hydraulic component.

8. The aircraft system according to claim 1, wherein the controller is configured to carry out the at least a part of the procedure to interrogate the aircraft braking system.

9. An aircraft comprising the aircraft system according to claim 1.

10. The aircraft system of claim 1, wherein the controller is configured to determine the procedure to interrogate the aircraft braking system on the basis of the at least one signal.

11. The aircraft system according to claim 1, wherein the procedure to interrogate the aircraft braking system comprises interrogating a valve or an actuator of the aircraft braking system.

12. A method of operating a controller of an aircraft system of an aircraft, the method comprising:
   receiving at least one non-simulated signal during a real landing procedure of the aircraft;
   determining that the aircraft is at a predetermined stage in the real landing procedure prior to touchdown of the aircraft, on the basis of the at least one non-simulated signal, wherein the predetermined stage is before a command to extend at least one landing gear of the aircraft is issued during the real landing procedure;
   on the basis of the determination, and before the command to extend the at least one landing gear of the aircraft is issued, cause the aircraft system to initiate a first part of a procedure to interrogate an aircraft braking system of the aircraft;
   in response to the issued command to extend the at least one landing gear of the aircraft, causing the aircraft system to initiate a remaining part of the procedure to interrogate the aircraft braking system, the remaining part to be performed after completion of the first part, whereby initiating the first part of the procedure to interrogate the aircraft braking system before the command to extend the at least one landing gear is issued causes the remaining part of the procedure to interrogate the aircraft braking system to be initiated after the command to extend the at least one landing gear is issued and thus to be completed before touchdown of the aircraft.

13. The method according to claim 12, comprising interrogating the aircraft braking system according to the at least a part of the procedure to interrogate the aircraft braking system, wherein the interrogating the aircraft braking system comprises operating one or more components of the aircraft braking system and detecting a response of the aircraft braking system to the operation of the one or more components.

14. A non-transitory computer-readable storage medium storing instructions that, if executed by a controller of an aircraft system of an aircraft, cause the controller to carry out the method according to claim 12.

15. The method of claim 12, comprising determining the procedure to interrogate the aircraft braking system on the basis of the at least one signal.

16. An aircraft comprising the non-transitory computer-readable storage medium according to claim 14.

17. The method according to claim 12, wherein the procedure to interrogate the aircraft braking system comprises interrogating a valve or an actuator of the aircraft braking system.

18. An aircraft system for an aircraft, the aircraft system comprising:
   a sensor system that is configured to sense at least one characteristic of the aircraft during a real landing procedure of the aircraft, and to output information representative of the at least one characteristic;
   a braking system that is configured to brake one or more wheels of the aircraft; and
   a system controller that is configured to:
      receive the information from the sensor system;
      determine that the aircraft is at a predetermined stage in the real landing procedure prior to touchdown of the aircraft, on the basis of the information, wherein the predetermined stage is before a command to extend at least one landing gear of the aircraft is issued during the landing procedure;
      on the basis of the determination, and before the command to extend the at least one landing gear of the aircraft is issued, cause the aircraft system to initiate a first part of a procedure to interrogate the braking system on the basis of the determination;
      in response to the issued command to extend the at least one landing gear of the aircraft, cause the aircraft system to initiate a remaining part of the procedure to interrogate the aircraft braking system, the remaining part to be performed after completion of the first part,
   whereby initiating the first part of the procedure to interrogate the aircraft braking system before the command to extend the at least one landing gear is issued causes the remaining part of the procedure to interrogate the aircraft braking system to be initiated after the command to extend the at least one landing gear is issued and thus to be completed before touchdown of the aircraft.

19. An aircraft comprising the aircraft system according claim 18.

20. The aircraft system according to claim 18, wherein the procedure to interrogate the aircraft braking system comprises interrogating a valve or an actuator of the aircraft braking system.

* * * * *